United States Patent [19]

Pugh

[11] Patent Number: 5,185,865
[45] Date of Patent: Feb. 9, 1993

[54] SYSTEM FOR SIMULATING BLOCK TRANSFER WITH SLAVE MODULE INCAPABLE OF BLOCK TRANSFER BY LOCKING BUS FOR MULTIPLE INDIVIDUAL TRANSFERS

[75] Inventor: Robert Pugh, Los Gatos, Calif.

[73] Assignee: Apple Computer, Inc., Cupertino, Calif.

[21] Appl. No.: 389,759

[22] Filed: Aug. 4, 1989

[51] Int. Cl.⁵ ...................... G06F 13/32; G06F 13/42
[52] U.S. Cl. .................................. 395/275; 364/238.3; 364/240.5; 364/260; 364/262.1; 364/927.99; 364/941.8; 364/937; 364/942.7; 364/957.1; 364/960.2; 364/DIG. 1; 364/DIG. 2
[58] Field of Search ... 364/200 MS File, 900 MS File; 395/275

[56] References Cited

U.S. PATENT DOCUMENTS

| | | | |
|---|---|---|---|
| 3,771,135 | 11/1973 | Huettner et al. | 340/172.5 |
| 4,017,839 | 4/1977 | Calle et al. | 340/172.5 |
| 4,261,033 | 4/1981 | Lemay et al. | 364/200 |
| 4,719,563 | 1/1988 | Kosuge et al. | 364/200 |
| 4,751,634 | 6/1988 | Burrus, Jr. et al. | 364/200 |
| 4,836,416 | 5/1983 | Giltner et al. | 364/900 |
| 4,920,483 | 4/1990 | Pogue et al. | 364/200 |
| 4,947,368 | 8/1990 | Donaldson et al. | 364/900 |

*Primary Examiner*—Thomas C. Lee
*Assistant Examiner*—Ken S. Kim
*Attorney, Agent, or Firm*—Blakely, Sokoloff, Taylor & Zafman

[57] ABSTRACT

Interface ciruitry for accomplishing a block transfer of information over a NuBus protocol bus having associated therewith a plurality of individual computer modules through the steps of testing to determine whether an addressed module is capable of accomplishing a NuBus protocol block transfer, conducting such a transfer if that module is capable of accomplishing a NuBus protocol block transfer, locking the bus if that module is not capable of accomplishing a NuBus protocol block transfer, conducting a series of individual data transfer operations during the period the bus is locked, terminating the individual operations, and unlocking the bus.

4 Claims, 2 Drawing Sheets

SYSTEM FOR SIMULATING BLOCK TRANSFER WITH SLAVE MODULE INCAPABLE OF BLOCK TRANSFER BY LOCKING BUS FOR MULTIPLE INDIVIDUAL TRANSFERS

BACKGROUND OF THE INVENTION

1. Field of the Invention

This invention relates to computer circuitry and, more particularly, to computer bus interface circuitry.

2. History of the Prior Art

Computers utilize buses, sets of signal lines, for carrying the information from one computer component to another. There have been many computer buses designed. One of these buses which is defined by an industry specification is the "NuBus", see *NuBus -- A Simple 32-Bit Backplane Bus P1196 Specification*, Draft 2.0, IEEE P1196 Working Group, Dec. 15, 1986. The specification for the NuBus defines a computer backplane bus optimized for transfers of thirty-two bit words and multiprocessor operations. The NuBus is designed to connect between a number of computer devices termed "boards" or "modules" for transferring information between such devices. In the vernacular of the NuBus specification, a bus device which initiates a transaction is called a "master" and a bus device which responds to a transaction called a "slave".

The only transfers allowed by the NuBus are a read operation, a write operation, and block transfer versions of each of the read and write operations. A block transfer is one in which a single starting address conveyed by a master board identifies multiple data items residing in sequential addresses which are to be communicated between the master and slave boards. Blocks transfers allow the more rapid transfer of information than do the normal read and write operations conducted on the NuBus because up to sixteen words of data residing at sequential addresses may be moved without having to transmit more than a single starting address or to arbitrate for the use of the bus between words of data.

An unfortunate problem encountered in utilizing the NuBus is that not all computer devices which have been designed to be connected to the NuBus are capable of accomplishing block transfers of information. Moreover, even a particular board designed to support block transfers on the NuBus does not necessarily support block moves with respect to all addresses. Although it is conceivable that a programmer would be able to devise a program which would utilize block transfers between devices only when those devices were able to accomplish block transfers, such a program would be very complicated to write, would require that the programmer know the abilities of each board which might be connected to the NuBus, and would slow down block moves which are useful only because they are fast. Consequently, it is desirable that the interface between a board and a NuBus provides some means for handling block transfers when not all computer devices connected to the NuBus support such block transfers in a manner transparent to the software implementing a particular block transfer. Thus, a programmer may program a block transfer; and the interface hardware may perform a block transfer on the NuBus if it can be supported, or accomplish the transfer in the most rapid means possible under the circumstances if the block more capability does not exist.

SUMMARY OF THE INVENTION

It is, therefore, an object of the present invention to increase the speed of computer bus operations.

It is another object of this invention to provide interface circuitry for use with a NuBus protocol computer bus which circuitry is capable of providing block transfers to computer devices on the bus which are capable of making such transfers and is capable of transferring information hen a block move is requested of a computer device on the bus incapable of handing a block transfer in a manner transparent to this software implementing the block transfer.

These and other objects of this invention are accomplished by interface circuitry for a NuBus protocol bus associated with a plurality of individual computer modules which interface circuitry tests stored indications to determine whether that module is capable of accomplishing a NuBus protocol block transfer, conducts such a transfer if that module is capable of accomplishing a NuBus protocol block transfer, locks the bus and the slave module if that module is not capable of accomplishing a NuBus protocol block transfer, conducting a series of individual transfer operations upon data during the period the bus and the slave module are locked, terminates the individual operations, and unlocks the bus and the slave module.

These and other objects and features of the invention will be better understood upon reading the detailed description which follows taken together with the drawings in which like elements are referred to by like designations throughout the several views.

NOTATION AND NOMENCLATURE

Figure 1:
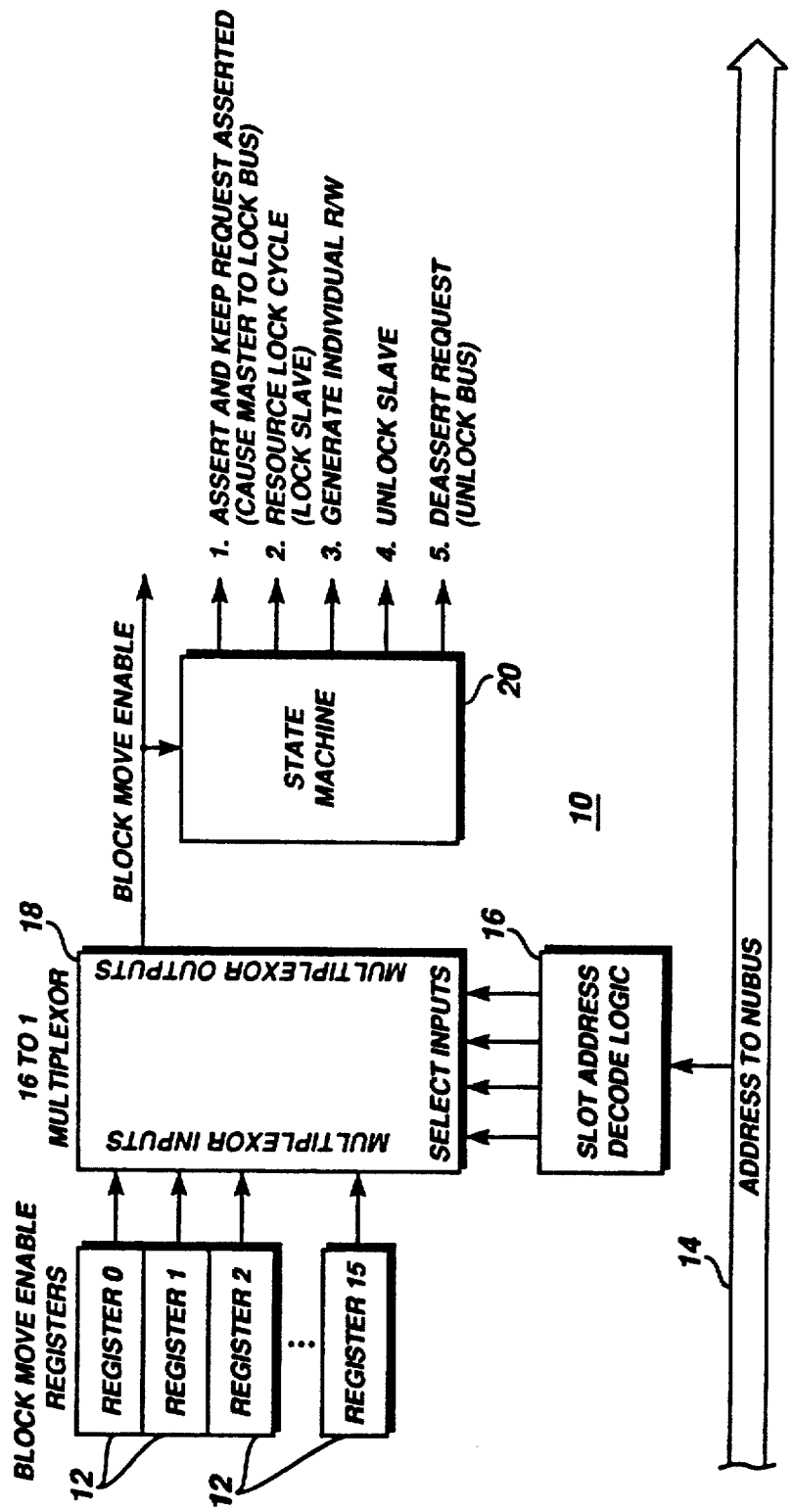
FIG. 1 is a block diagram illustrating the circuitry of the invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art.

An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored transferred, combined, compared, and otherwise manipulated. It has proven convenient at times, principally for reasons of common usage, to refer to three signals as bits, values, elements, symbols, characters, terms, numbers, or the like. It should be borne in mind, however, that all of these and similar terms are to be associated with the appropriate physical quantities and are merely convenient labels applied to these quantities.

Further, the manipulations performed are often referred to in terms, such as adding or comparing, which are commonly associated with mental operations performed by a human operator. No such capability of a human operator is necessary or desirable in most cases in any of the operations described herein which form part of the present invention; the operations are machine operations. Useful machines for performing the operations of the present invention include general purpose digital computers or other similar devices. In all cases the distinction between the method operations in operating a computer and the method of computation itself should be borne in mind. The present invention relates to apparatus and to method steps for operating a computer in processing electrical or other (e.g. mechanical, chemical) physical signals to generate other desired physical signals.

DETAILED DESCRIPTION OF THE INVENTION

The NuBus is a computer backplane bus optimized for thirty-two bit transfers, and multiprocessor operations. It is a synchronous, multiplexed, multimaster bus. The bus itself has ninety-six lines, thirty-two of which are multiplexed to carry first address information and later data. Two lines are used to indicate the transfer mode (read, write, block read, block write) and to indicate success or failure of a transaction. One line carries a start signal; one line caries an acknowledge signal; one line carries a bus request signal by which a master indicates it desires the bus. Four lines carry arbitration signals which are compared to master identification signals during arbitration to determine which master board owns the bus.

In order to use the NuBus, it is necessary for a board connected to the NuBus to obtain ownership of the bus. A board obtains ownership by requesting the bus by initiating a bus request signal and waiting until the distributed arbitration logic determines that the next owner will be that board. The arbitration logic conducts an arbitration contest to resolve bus ownership between one or more completing master boards. This arbitration contest takes two bus periods. The net effect of an arbitration contest is that two cycles after starting the contest, the decision is made as to which master board will be the next bus owner. The NuBus protocol includes a method by which if a board does not win an arbitration contest, it receives a place in line for the next arbitration contest. Consequently, the obtaining of the ownership of the bus may take some substantial period of time.

Once a board obtains a position where it will be the next owner, it waits until the bus is idle. Where it obtains the bus, the master board begins a transaction, a lock cycle, a read, a write, or a block write or write with a start cycle. A start cycle is one in which the start line carries the start signal, the transfer mode lines indicate the type of transaction, and the thirty-two bit address/data lines carry the address of the slave module. The start cycle is followed at least by an acknowledge cycle which includes an acknowledge signal on the acknowledge line and an indication on the transfer mode lines of how the transaction was completed, successfully, postponed, by an error, or by bus timeout. Between the start signal and the acknowledge signal, data is usually transferred. For example, if the master board wishes to do a read word transaction, then the start signal, the type of transaction and the desired word address are placed on the bus. All of the boards on the NuBus sense the address. If a slave board determines that the address refers to itself, then at some subsequent cycle when it is able to respond, it will place the requested data on the multiplexed address lines and issue an acknowledge cycle. When the master modules senses the acknowledge signal, it knows the data on the bus is valid and reads it. This completes the transaction, and bus ownership may or may not pass to some other module.

In a like manner, when a master board initiates a write word cycle, it must obtain ownership of the bus through the bus arbitration process by requesting the bus and waiting until the arbitration logic determines that it owns the bus. Once it obtains the bus, the master board provides a start cycle containing the start signal, the appropriate address, and the type of transaction. On the next cycle, the master board provides the data on the thirty-two lines which carried the address. Upon receiving the information the slave board issues an acknowledge signal thereby completing the transaction.

Since both read and write transactions require at least two cycles in order to convey any information, not including the time required for bus arbitration and waiting for a bus or a board which is already in use, it is desirable that information be transferred where possible in groups larger than one word. This is possible on the NuBus for data residing in sequential memory addresses. It is accomplished by the block transfer transaction. In a block transfer transaction, bus ownership is first acquired; then a start signal, including the address and type of transaction (block read or block write) is transferred. Also communicated on selected address lines during the start cycle is the length of the particular block transfer to take place. Block lengths may be two, four, eight, or sixteen words. After the start signal, data is placed on the NuBus each cycle; and its receipt is acknowledged by a signal on one of the transfer mode lines (the TMO line). In the next cycle, the next word is transferred, and its receipt is acknowledged in the same manner. This process continues until all of the data has been transferred, and an acknowledge signal is produced on the acknowledge line. It should be noted that the acknowledgement signals placed on the NuBus during the interim transfers of words in a block transfer are accomplished by signals on the transaction mode lines rather than by a normal acknowledge signal so that the transaction is not considered to be complete during any interim transfer as it would be were a signal transferred on the acknowledge line.

It will be apparent that, because the addressing steps are not necessary for moving each word in a block transfer and because no arbitration or waiting is necessary to obtain the bus between individual word transfers in a block transfer, this block mode of transfer is much faster than is single word transfer on the NuBus. However, it should be remembered that such transfer is only available for words in sequential addresses.

More importantly, all boards which may be connected to a NuBus may not be able to accomplish block transfers. For example, the Mac II mother board for the Mac II series of personal computers manufactured by Apple Computer Corporation, Cupertino, Calif., is not capable of block transfers yet is a present the primary computer to utilize the NuBus as a system bus. In operations conducted by the Apple Mac II computers, it is very desirable to be able to use the block move operation in order to speed the computer system whenever possible. This is especially true in the implementation of the processing of graphics by the computer since so much information must be handled in providing information in a graphics environment. Consequently, it is desirable that a programmer preparing a program for use in a system utilizing the NuBus, such as the Apple Mac II, be able to program block transfers wherever feasible for the transfer of large amounts of sequentially addressable information. It is also desirable that if a program utilizes bock transfers of information such transfers be handled by the bus interface circuitry in the most rapid manner possible whether that is an actual block transfer or some other method of accomplishing a movement of information and that the manner of transfer be transparent to the software.

The present invention provides interface circuitry which when a block transfer is requested checks internal memory referencing the module addressed to determine if a block transfer can be made by that module. If a block transfer can be made, then the block transfer protocol of the NuBus is used; and the information is transferred rapidly. If a block transfer cannot be made, then the interface utilizes a transfer protocol called (for the purpose of this specification) a pseudo block transfer to move the date more rapidly than it would be transferred by individual read or write instructions. FIG. 1 illustrates in block diagram form an arrangement for accomplishing the invention. The interface circuit 10 illustrated in FIG. 1 includes a plurality of block enable registers 12, one register for each board connected to the NuBus 14. Each register 12 stores a signal which indicates whether the board the register represents is able to do block transfers or not. When a block transfer is programmed, the slot address for the module of interest is reviewed in the selected one of the block enable registers 12. This is accomplished by signals sent to a block address decode logic circuit 16 which provides signals to cause a multiplexor 18 to select the appropriate one of the registers 12. If the selected block move enable register indicates that block transfers are allowed, then a block transfer is accomplished. If the selected block move enable register indicates that a block move is not allowed, then a signal is sent to a state machine 20 which initiates signals for causing a pseudo block transfer to take place.

In a pseudo block transfer, the master board sends a first request signal asking for ownership of the bus. Once it obtains ownership through the process of arbitration, the master locks the bus by continuing to send the request signal. This continuing request signal locks the bus so that no arbitration occurs while it remains asserted. A single cycle resource lock transaction is then performed to lock the addressed resource (the slave module). This is accomplished by an attention cycle on the NuBus asserted by the master board. An attention cycle includes a start signal, an acknowledge signal, and signals on the transfer mode lines indicating a resource lock. When the NuBus and the slave module are locked, no other processor including a processor on the slave board is capable of utilizing the addressed space until the lock is released. At this point, the arbitration process has been completed, ownership of the bus obtained, and the bus and slave board are locked; the state machine 20 then provides the signals for effecting a number of individual read or a number of individual write transactions on the bus. Although each transaction requires a start cycle with a start signal, an address, and a transaction type, and a cycle for the transfer of data and the acknowledgement of the transfer, such a series of multiple transactions is much faster than are the same number of individual transactions practiced apart from the pseudo block transaction. This is true because it is not necessary for the master board to arbitrate for the bus between the individual word transfers. Furthermore, it is not possible for any processor including one which is on the slave board to intervene and use the address space utilized in the transfer during the time between transfers of individual words on the NuBus so long as the NuBus remains locked. Thus, the transaction need not wait for local operations on the slave board to be completed. Once the transfer has been accomplished, the resource is released (unlocked) by an attention-null cycle (start, acknowledge, and null on the transfer mode lines), and the NuBus is unlocked and released by removing the request signal. It has been determined through use of a preferred embodiment of the invention that the time required to accomplish a pseudo block transfer, although not as fast as an actual block move, lies approximately half way between the times for a lock move and a conventional word accesses.

Figure 2:
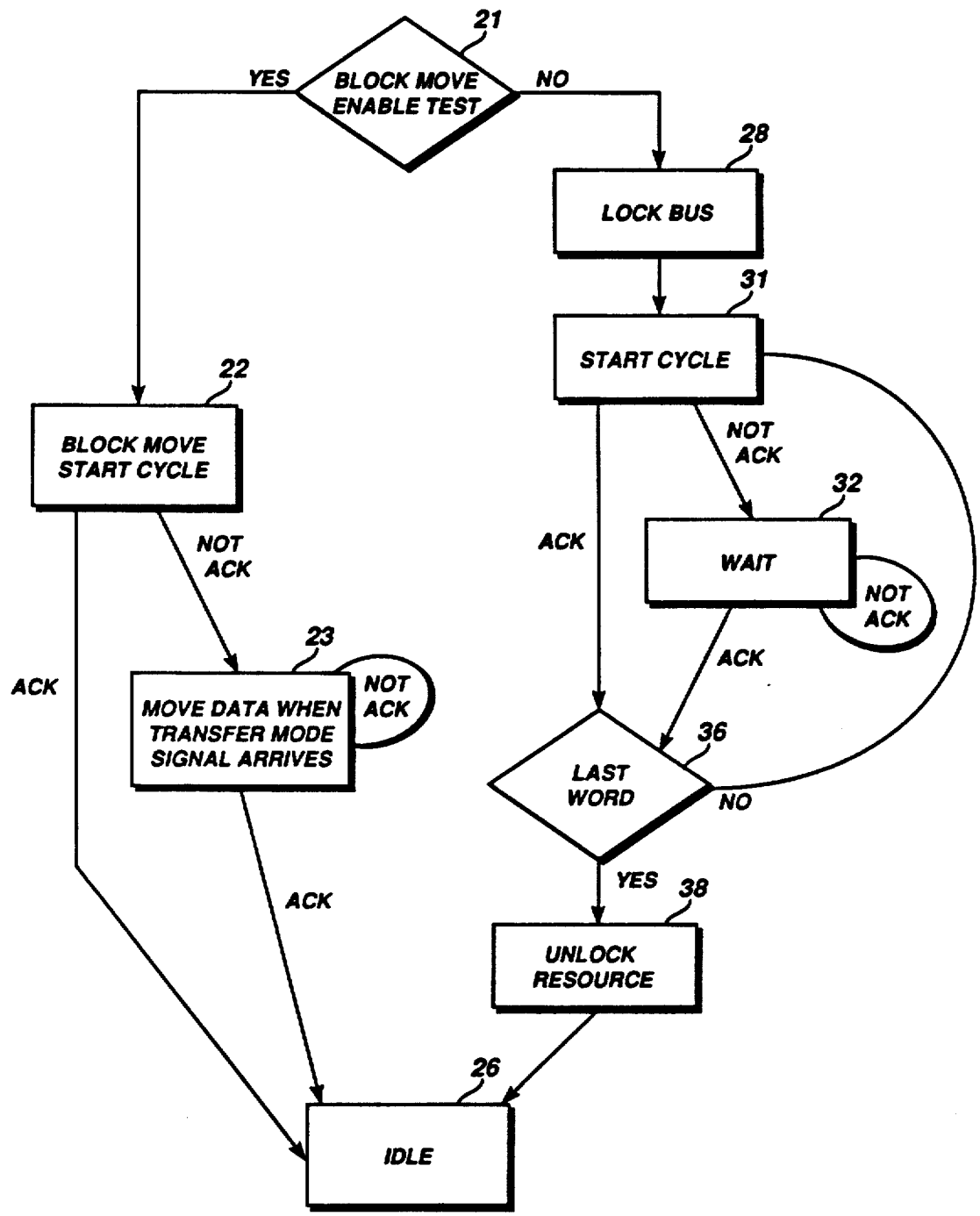
FIG. 2 is a flow chart illustrating the logic of operation of a portion of the circuitry shown in FIG. 1.

FIG. 2 illustrates in block diagram form a flow chart for the operation of system of the circuit 10 in conducting a block or pseudo block move. As illustrated, each square block represents a state of the state machine 20 during one cycle of operation. At decision 21, a block transfer enable signal is read from the block enable register 12 for the particular device addressed. If the block enable signal indicates a "yes", then the operation moves to step 22 to begin the NuBus block transfer. At step 22, a start cycle is initiated. At step 23, the data is moved with each word being acknowledged by a signal on one of the transaction type lines. When the block transaction is completed by an acknowledge cycle including an acknowledge signal on the acknowledge line and an indication of the success of the operation on the transaction type (TM0, TM1) lines, the operation moves to step 26 to complete of the operation. As is shown in FIG 2, a bypass exists from block 22 to block 26 for a case in which the particular slave module cannot for some reason accomplish a block move. This is indicated by an immediate acknowledge signal an the acknowledge line.

If at decision 21 the block transfer enable test results is a "no" indicating that a block transfer is not possible with the particular slave board connected to the NuBus, then the operation moves to block 28 at which a NuBus resource lock attention cycle takes place.

After the resource lock attention cycle, a start cycle is begun at step 31 for the particular transfer including a start signal, an address, and a transaction type (read or write). After the start cycle, if an acknowledge signal on the acknowledge line is not immediately returned from the slave module, a wait state is entered at step 32. The state machine 20 will stay in the wait state at step 32 until an acknowledge signal arrives from the slave module. After the wait state, a decision 36 tests whether the last word of the block has been moved; if it finds the last word has not been moved, it moves to step 31.

After any wait period, a start cycle is performed at step 31. A single word of data is moved onto the bus; and the respect of that data is acknowledged. A check is then made at decision 36 to determined whether this is the last word to be transferred in the pseudo-block move; if it is not, the operation returns to step 31 and beings another individual word transfer. After the last one of these individual word transfers has been completed for the particular pseudo-block transfer operation and tested at decision 36, the state machine 20 goes to step 38 and performs a null attention cycle to unlock the resources on the bus. After this cycle, the state machine 20 enters an idle state at step 26.

Those skilled in the art reviewing the steps of the pseudo block transfer operation will understand that the locking of the bus accomplished during the transaction will accelerate the completion of the transaction appreciably over the operation of the myriad of individual transactions necessary for the same amount of information because of the bus arbitration process need not be used more than once and the local processors (such as the system central processing unit in the Mac II) cannot access the addressed memory during the interval of the transaction and cause the transition to wait for rearbitration of the slave memory with a processor on the slave board.

Although the invention has been described with reference to particular arrangements and systems, it will be apparent to those skilled in the art that the details of those arrangements and systems are used for illustrative purposes only and should not be taken as limitations of the invention. It is, thus, to be contemplated that many changes and modifications may be made by those of ordinary skill in the art without departing from the scope and spirit of the invention. The invention should, therefore, be considered to be described only in terms of claims which follow.

What is claimed is:

1. The method of accomplishing a block transfer of information over a NuBus protocol bus having associated therewith a plurality of individual computer modules comprising the steps of testing to determine whether an addressed module is capable of accomplishing a NuBus protocol block transfer; conducting such a transfer if that module is capable of accomplishing a NuBus protocol block transfer; conducting a pseudo-block transfer if that module is not capable of accomplishing a NuBus protocol block transfer comprising the steps of locking the bus, conducting a series of individual data transfer operations without arbitration between the individual operations during the period the bus is locked, terminating the individual operations, and unlocking the bus; and in which the step of conducting a series of individual data transfer operations without arbitration between the individual operations during the period the bus is locked comprises the steps of initiating a start cycle; transferring a word of data and waiting for an acknowledge cycle; testing whether additional words are to be transferred; and continuing the steps of initiating a start cycle, transferring a word of data, and waiting for an acknowledge cycle until all words of data have been transferred.

2. The method of accomplishing a block transfer of information over a NuBus protocol bus as claimed in claim 1 in which the step of initiating a start cycle comprises the step of identifying the operation as a read operation.

3. The method of accomplishing a block transfer of information over a NuBus protocol bus as claimed in claim 1 in which the step of initiating a start cycle comprises the step of identifying the operation as a write operation.

4. A bus interface for connecting individual computer modules to a NuBus protocol bus comprising means for storing indication of the capability of each individual computer module associated with the bus to conduct a NuBus protocol block transfer, means responsive to an indication that a NuBus protocol block transfer is desired for a particular module for testing the stored indication of the capability of the individual computer module to conduct a NuBus protocol block transfer, means responsive to an indication that the individual computer module is capable of conducting a NuBus protocol block transfer for conducting a NuBus protocol block transfer, and means responsive to an indication that the individual computer module is not capable of conducting a NuBus protocol block transfer for connecting a pseudo block transfer in which the bus is locked and a master module is cased to conduct a series of individual transfers with the individual computer module over the locked bus without arbitration between the individual transfers; and in which the means for conducting a pseudo block transfer comprises a state machine for initiating signals for locking the bus, for locking the module addresses, for initiating a number of individual word transfers during the period in which the bus is locked, and for unlocking and releasing the bus.

* * * * *